Patented June 1, 1926.

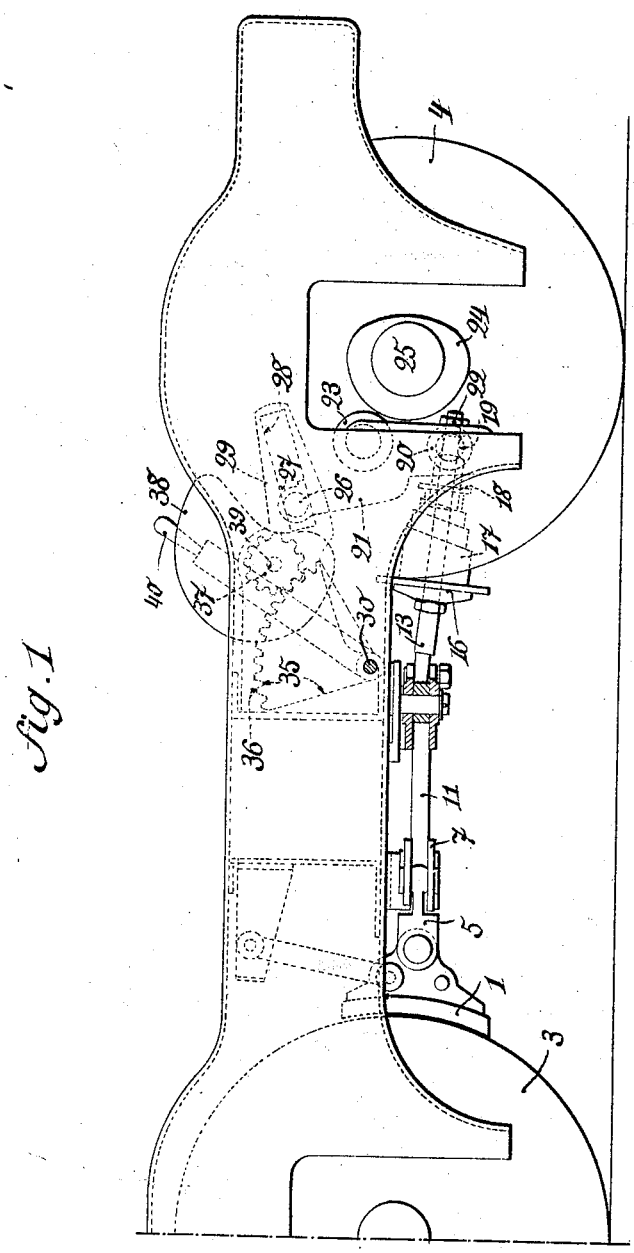

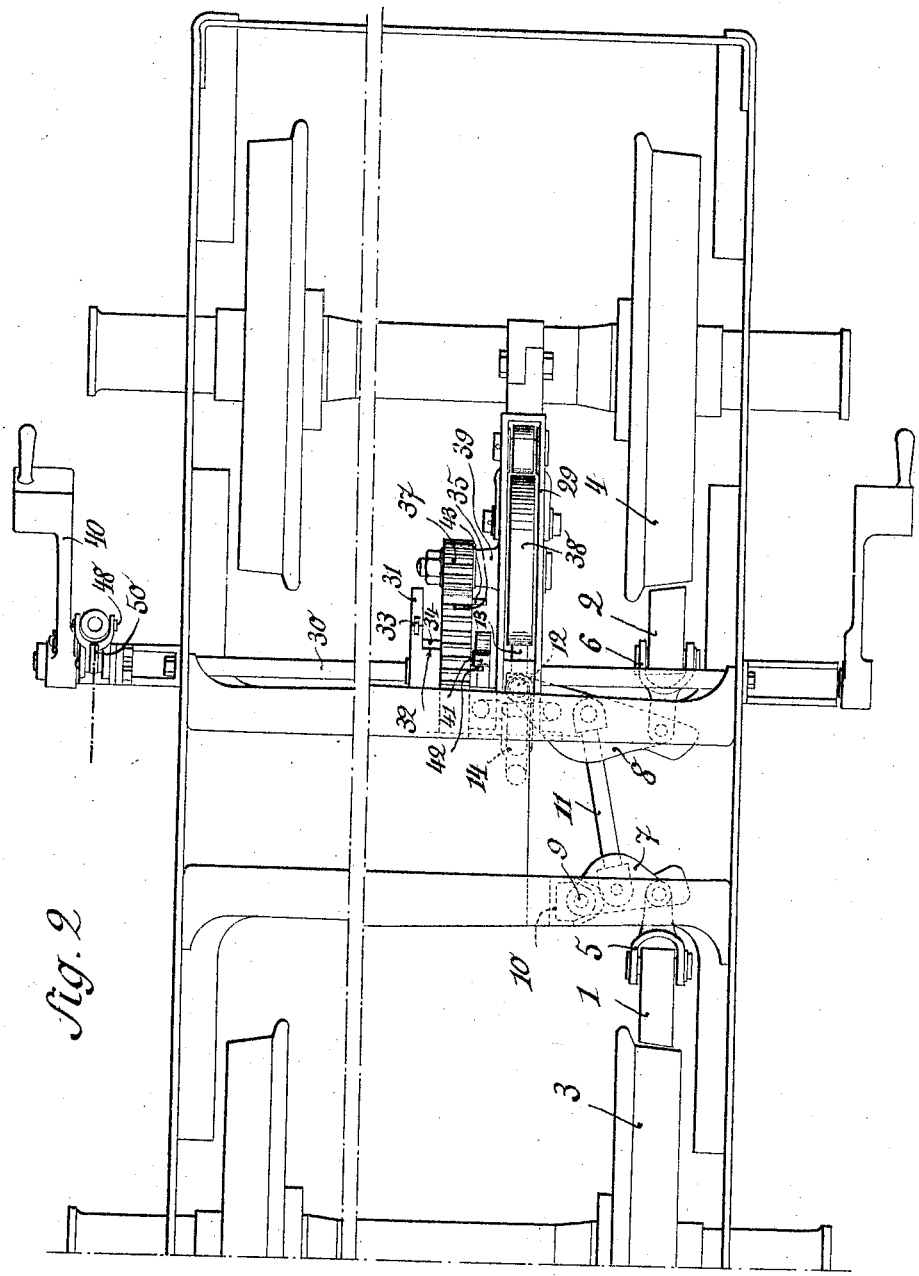

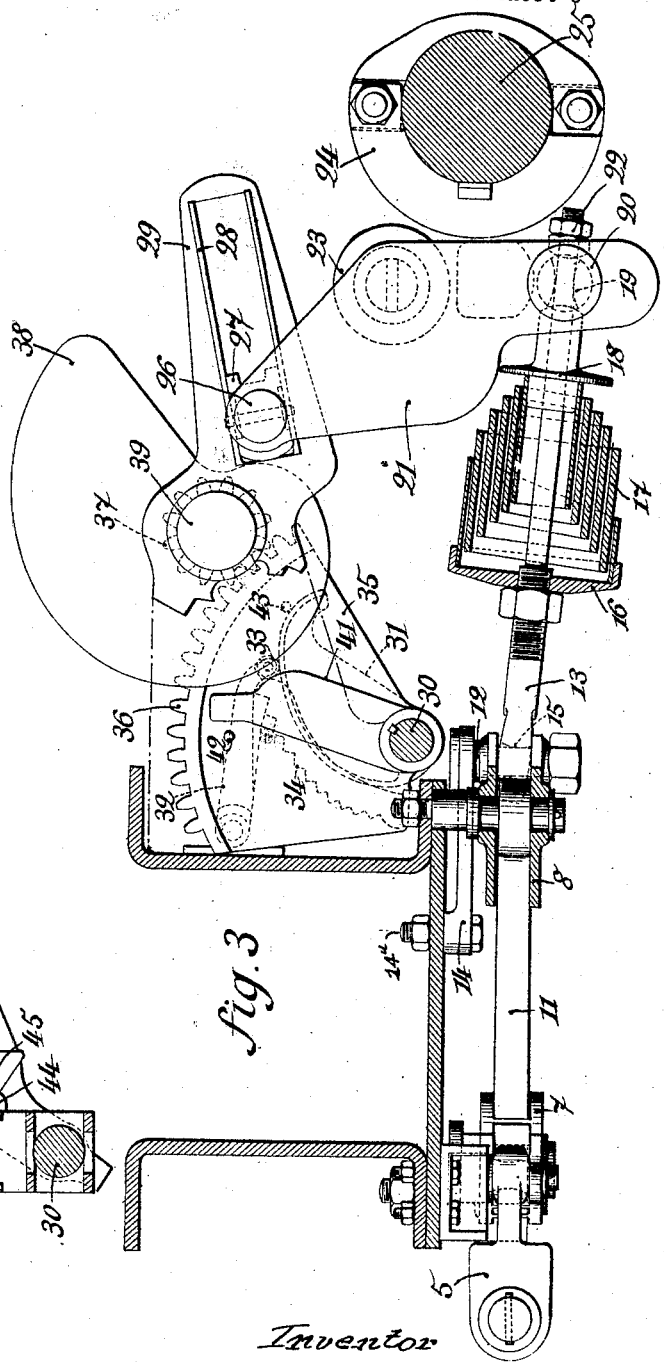
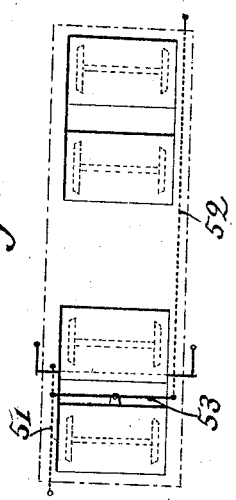
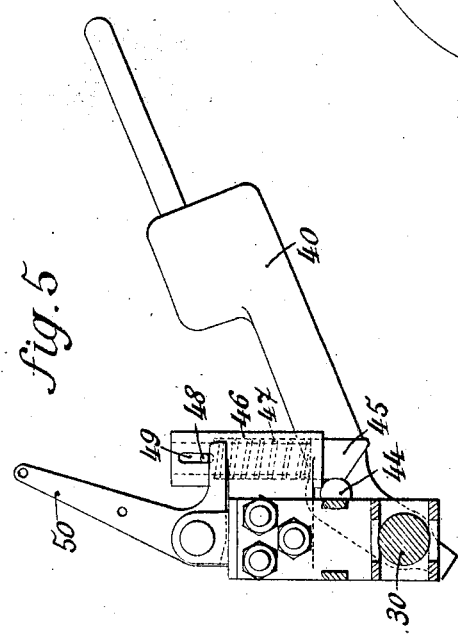

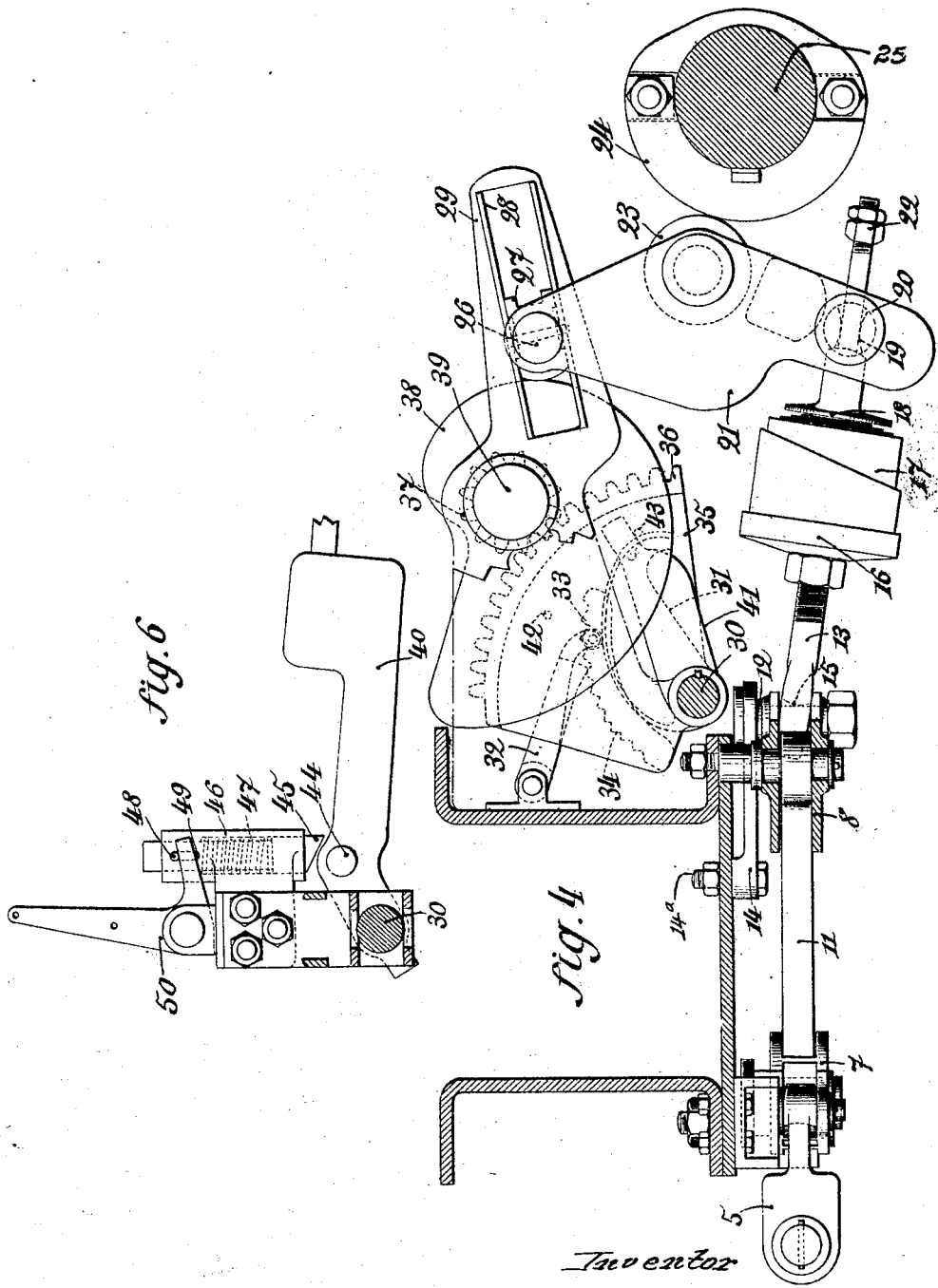

1,587,364

UNITED STATES PATENT OFFICE.

LOUIS BOIRAULT, OF PARIS, FRANCE.

MOMENTUM BRAKE FOR RAILWAY VEHICLES.

Application filed October 2, 1922, Serial No. 591,887, and in France November 19, 1921.

My invention relates to a hand brake which provides for an energetic braking action and may be operated with a small amount of power. For this purpose the brake makes use of the momentum of the vehicle, and a cam which is keyed to one of the axles is caused to actuate the rod and link mechanism of the brake shoes. It is simply necessary to act upon one of the control chains which extend for example to the two ends of the wagon, in order to release a lever provided with a counterweight which turns a shaft and a toothed quadrant mounted thereon, so as to rotate a cam which brings near the axle a lever connected with the rod and link mechanism of the brake, the outline of said cam being so designed as to provide for a non-reversible control.

The accompanying drawing shows by way of example a form of construction of the device according to the invention.

Fig. 1 is a side elevation of a bogie with certain parts of the brake shown in section, and, Fig. 2 is a corresponding plan view.

Fig. 3 is a side elevation on a larger scale of the brake device as a whole, in the inoperative position, and, Fig. 4 is a like view in the braking position.

Fig. 5 shows the locking device for the counterweight lever in the inoperative position, and, Fig. 6 in the braking position.

Fig. 7 is a general plan view showing the control devices.

The brake device acts upon the brake shoes controlled by the rod and link mechanism. The accompanying drawing represents two brake shoes 1, 2 acting upon the wheels 3, 4 of a bogie, and situated upon the same side of the latter. To the said shoes are pivoted the connecting members 5, 6 which are connected with the balance levers 7, 8. The balance lever 7 is pivoted at 9 upon a crosspiece 10 of the bogie frame and is connected with the balance lever 8 by a link 11; the said balance lever 8 is pivoted to a rod 13, by means of a pivot 12, guided in a member 14 forming a slide and which is secured to the under side of the bogie frame by means of a bolt 14ª.

The rod 13 is enabled to effect the throwing of the brakes 1 and 2 by pushing upon the balance lever 8, and this throwing action will be equalized by reason of the abovementioned joints. In order to give the rod 13 a free motion, the aperture 15 through which the pivot 12 is disposed has rounded walls as shown in Figs. 3 and 4 of the drawing. Upon the rod 13 is secured a concave disc 16 co-operating with a spring 17 upon which is caused to bear a slidable sleeve 18. The end of the rod 13 extends through an aperture 19 with rounded walls formed in the cross-piece 20 which is secured between the two cheeks of a balance lever 21.

The sleeve 18 bears upon the cross-connecting member 20, and the rod 13 is provided with an adjustable stop-piece 22 formed for example of a nut and lock-nut whereby it is also enabled to bear upon the member 20. Upon the balance arm 21 is disposed a roller 23 co-operating with a cam 24 mounted on the axle 25; at the upper end thereof is secured a cross-connecting member 26 having revoluble thereon a slide 27 engaged in a slot 28 formed in a support 29 which is secured to the frame. In the said support is disposed a shaft 30 having mounted thereon a cam 31 co-operating with a pawl 32 through the medium of a roller 33, said cam having a suitable shape whereby the said pawl shall be always disengaged before the brake is released.

The pawl 32 is pivoted to the bogie frame, and its end is engaged by its own weight (and if necessary by means of a spring) with the teeth of a ratchet 34 secured to a quadrant 35 loosely mounted on the shaft 30; the said quadrant has a circular toothed portion 36 co-operating with a pinion 37 secured to a non-reversible cam 38 whose shaft 39 is mounted on the support 29. By nonreversible, is meant that the spiral outline of this cam will prevent the rotation thereof by pressure exerted on its periphery by the balance lever 21. A counterweight lever 40 is secured to each end of the shaft 30 and may rotate the quadrant 35 by an arm 41 which is also mounted on the shaft 30 and is adapted to act alternately upon two studs 42, 43 secured upon the quadrant 35. One of the levers 40 is provided with a tappet 44 which co-operates with the end of a locking bolt 45 slidable in a fixed socket 46 and urged downwardly by the spring 47; the stem of said bolt carries a spindle 48 slidable in apertures 49 formed in the socket 46 and engaging a forked lever 50 whose outer end is bent at an angle; said lever can be controlled from either end of the wagon, Fig. 7, for example by chains 51, 52, the chain 51 acting in a direct manner and chain 52 by means of a balance lever 53.

The operation of the said device is as follows:

By drawing upon one of the chains 51 or 52, with the parts in the position of Fig. 3, the bolt 45 is raised against the action of the spring 47, and it leaves the tappet 44, so that the levers 40 will fall by their own weight, Fig. 6, drawing with them the shaft 30.

The parts then proceed from the position of Fig. 3 to that of Fig. 4 in the following manner. The arm 41 acts upon the stud 43 and lowers the quadrant 35; in this movement, the teeth 36 actuate the pinion 37 and thus rotate the cam 38 in the counter-clockwise sense. The cam now drives out the slide 27 and thus brings the roller 23 near the cam 24; even when the wagon is at rest, the shoes are brought near the wheels, thus providing for a preliminary braking on the spot. If the wagon is running, the cam 24 will act at each revolution of the wheels and for a considerable part of a revolution, upon the balance lever 21, thereby driving forward the sleeve 18 and compressing the spring 17, thus actuating the balance lever 8 in an elastic manner in order to produce a braking action whose power may be determined in advance. At the same time, the rotation of the shaft 30 produces the rotation of cam 31 secured thereto, and the pawl 32 is thus left against the ratchet 34, Fig. 4.

When the brake is to be released, one of the levers 40 is raised by hand until the stop-piece 44 is engaged in the rear of the bolt 45, Fig. 3, and in this movement, the cam 31 will at once turn with the shaft 30, raising the pawl 32 and permitting the rotation of the quadrant 35; the latter is subsequently actuated when the arm 41 bears upon the stud 42. In this manner the cam 38 returns to the original position, and the cam 24 no longer acts upon the balance lever 21.

The said brake can be readily operated by the men when upon the ground, and without any other effort than what is required to raise the bolt 45. The brakes are then automatically throw on, and this will last until the complete stop of the wagon; by reason of the form of the cam 24 and the use of the spring 17, the brake will be operated in a gradual manner and with an easy movement.

Claims:

1. In a brake for railway vehicles employing the momentum of the vehicle and of the hand-operated type the combination of an actuating cam which is keyed to an axle of the vehicle, braking elements acting upon the vehicle wheels, a balance lever actuated by said cam and having one end pivoted to said braking elements, a controlling cam, operating means for causing this controlling cam to rotate, and guiding means secured to the vehicle frame and adapted to guide the second end of the balance lever in a direction substantially transverse to the latter, this second end of the balance lever being adapted to directly engage the said controlling cam and guiding means.

2. In a brake for railway vehicles employing the momentum of the vehicle and of the hand operated type, the combination of an actuating cam which is keyed to an axle of the vehicle, braking elements acting upon the vehicle wheels, a balance lever actuated by said cam and having one end pivoted to said braking elements, a non reversible controlling cam against which the other end of the balance lever can bear, operating means for causing this controlling cam to rotate and guiding means secured to the vehicle frame and having the second mentioned end of said balance lever loosely slidable therein.

3. In a brake for railroad vehicles employing the momentum of the vehicle and of the hand-operated type, the combination of a cam which is keyed to an axle of the vehicle, braking elements acting upon the vehicle wheels, a balance lever actuated by said cam, one end of said balance lever being connected to the said braking elements, and the other end thereof being loosely guided, the operating point of the said cam being located between the two ends of the lever, a non-reversible cam acting upon the said other end of said balance lever, a pinion secured to said non-reversible cam, a control shaft, a toothed quadrant mounted loose upon said shaft and cooperating with said pinion, two studs disposed upon said quadrant, a swinging arm mounted upon said shaft and adapted to strike against said studs, a counterweight lever disposed upon said shaft, and means for maintaining said counterweight lever in the suspended position.

4. In a brake for railway vehicles employing the momentum of the vehicle and of the hand operated type, the combination of an actuating cam (24) which is keyed to an axle (25) of the vehicle, braking elements acting upon the vehicle wheels, a balance lever (21) actuated by said cam (24) and having one end pivoted to said braking elements, and the other end thereof being guided in a direction substantially transverse to said balance lever, means for bringing the said balance lever (21) adjacent the said actuating cam (24), these means comprising a shaft (30) arranged transversely to the axis of the vehicle, counterweight levers (40) mounted on the ends of this shaft, a toothed quadrant (35) mounted upon said shaft, a controlling cam (38) acting upon said other end of the balance lever, a pinion (37) secured to said cam and meshing with the said toothed quadrant, a spring-bolt engaging one of said counterweight levers and acting for maintaining the said levers in suspended position, and means for pulling this bolt, said means being so arranged as to be operated from both ends of the vehicle.

In testimony, that I claim the foregoing as my invention I have signed my name.

LOUIS BOIRAULT.